United States Patent
Wang et al.

(10) Patent No.: US 10,296,221 B1
(45) Date of Patent: May 21, 2019

(54) SYSTEMS AND METHODS FOR IMPROVING THE EFFICIENCY OF RECORDING DATA TO TAPE

(71) Applicant: Veritas Technologies, LLC, Mountain View, CA (US)

(72) Inventors: Haigang Wang, Shareview, MN (US); Xianbo Zhang, Plymouth, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 218 days.

(21) Appl. No.: 15/192,685

(22) Filed: Jun. 24, 2016

(51) Int. Cl.
*G06F 3/06* (2006.01)

(52) U.S. Cl.
CPC ............. *G06F 3/061* (2013.01); *G06F 3/065* (2013.01); *G06F 3/0682* (2013.01)

(58) Field of Classification Search
CPC .......................... G06F 11/1451; G06F 2201/84
See application file for complete search history.

(56) References Cited

U.S. PATENT DOCUMENTS

| | | | |
|---|---|---|---|
| 6,675,177 B1 * | 1/2004 | Webb ................... | G06F 11/1458 |
| 2016/0019117 A1 * | 1/2016 | Kumarasamy ...... | G06F 11/1417 707/650 |

* cited by examiner

*Primary Examiner* — Gary W. Cygiel
(74) *Attorney, Agent, or Firm* — FisherBroyles, LLP

(57) ABSTRACT

A computer-implemented method for improving the efficiency of recording data to tape may include (i) identifying a command to duplicate a data unit to tape storage after a previous version of the data unit has already been duplicated to tape storage, (ii) identifying metadata that distinguishes between segments of the data unit that have not changed since the previous version of the data unit and segments that have changed, (iii) reading the previous version of the data unit from tape storage and reading the segments of the data unit that have changed from a data sharing storage rather than tape storage, and (iv) combining, using the metadata, the segments read from tape storage that have not changed and the segments read from the data sharing storage that have changed to duplicate the data unit to tape storage. Various other methods, systems, and computer-readable media are also disclosed.

20 Claims, 5 Drawing Sheets

SYSTEMS AND METHODS FOR IMPROVING THE EFFICIENCY OF RECORDING DATA TO TAPE

BACKGROUND

Individuals and organizations typically seek to back up their valuable information. For example, enterprise organizations may routinely backup company information to one or more storage devices. The storage devices may include tape storage devices, as discussed further below. Depending on the specific circumstances, tape storage devices may provide higher sequential write speed, more ruggedness or durability, and/or lower data center power and cooling requirements, in comparison to other storage devices such as disk drives.

Additionally, enterprise organizations may update a data unit, such as a disk image, over time. When updating the data unit, the computing device performing the update may record the change in a separate data structure, rather than overwriting the specific physical data on storage. Over time, the data may become increasingly fragmented, in which separate portions of the same data unit are scattered over the underlying physical storage device. Issues such as fragmentation may slow down the process of recording data to tape, as discussed further below. Accordingly, the instant disclosure identifies and addresses a need for additional and improved systems and methods for improving the efficiency of recording data to tape.

SUMMARY

As will be described in greater detail below, the instant disclosure generally relates to systems and methods for improving the efficiency of recording data to tape by, for example, building an updated version of a data unit or disk image from a previous version that is read from tape storage quickly, rather than reading the previous version from a fragmented physical disk drive, which would be slower. In one example, a computer-implemented method for improving the efficiency of recording data to tape may include (i) identifying a command to duplicate a data unit to tape storage after a previous version of the data unit has already been duplicated to tape storage, (ii) identifying metadata that distinguishes between segments of the data unit that have not changed since the previous version of the data unit already duplicated to tape storage and segments of the data unit that have changed since the previous version of the data unit, (iii) reading the previous version of the data unit from tape storage and reading the segments of the data unit that have changed from a data sharing storage rather than tape storage, and (iv) combining, using the metadata, the segments read from tape storage that have not changed since the previous version and the segments read from the data sharing storage that have changed to duplicate the data unit to tape storage. In these examples, the data sharing storage may link a same instance of a common data portion to at least two instances of corresponding data that share the common data portion.

In one embodiment, the data unit may include a disk image. In further embodiments, the disk image stores both the content and the structure for at least one of a disk volume and a storage device. In additional embodiments, the disk image may include a sector-by-sector copy of a source medium.

In one embodiment, (i) the previous version of the data unit is separately available on both tape storage and the data sharing storage, (ii) reading the previous version of the data unit from tape storage is faster than reading the data unit from the data sharing storage, and (iii) reading the previous version of the data unit from tape storage is performed to achieve an efficiency improvement over reading the data from the data sharing storage. In some examples, reading the previous version of the data unit from tape storage is faster than reading the data unit from the data sharing storage at least in part due to the data unit being fragmented on the data sharing storage.

In further examples, identifying the metadata may include generating the metadata that distinguishes between segments of the data unit that have not changed since the previous version of the data unit already duplicated to tape storage and segments of the data unit that have changed since the previous version of the data unit. In additional examples, generating the metadata is performed in response to the command to duplicate the data unit to tape storage.

In one embodiment, the data sharing storage stores multiple segments of the data unit in separate original storage containers. In one embodiment, the data sharing storage stores: (i) multiple segments of each portion sequentially within a respective original storage container and (ii) each changed segment of the data unit sequentially within at least one additional container, separate from the original storage containers. In some examples, storing segments sequentially enables the segments to be read faster than if the segments were stored non-sequentially.

In one embodiment, combining, using the metadata, the segments read from tape storage that have not changed since the previous version and the segments read from the data sharing storage that have changed is performed on a scheduled frequency of at least once weekly. In one embodiment, the segments read from tape storage that have not changed since the previous version include a majority of the segments combined to duplicate the data unit.

In one example, the segments read from the data sharing storage that have changed since the previous version are stored sequentially on data extents of the data sharing storage but are scattered across the data unit. In additional examples, prior to combining the segments using the metadata, the segments read from the data sharing storage that have changed since the previous version are stored within a buffer to enable these segments to be reordered during combining with the segments read from tape storage that have not changed since the previous version to duplicate the data unit to tape storage. In one embodiment, the data sharing storage may include an integrated purpose-built backup appliance.

In one embodiment, a system for implementing the above-described method may include (i) an identification module, stored in memory, that: (a) identifies a command to duplicate a data unit to tape storage after a previous version of the data unit has already been duplicated to tape storage and (b) identifies metadata that distinguishes between segments of the data unit that have not changed since the previous version of the data unit already duplicated to tape storage and segments of the data unit that have changed since the previous version of the data unit, (ii) a reading module, stored in memory, that reads the previous version of the data unit from tape storage and reads the segments of the data unit that have changed from a data sharing storage rather than tape storage, (iii) a combining module, stored in memory, that combines, using the metadata, the segments read from tape storage that have not changed since the previous version and the segments read from the data sharing storage that have changed to duplicate the data unit to tape storage, and (iv) at least one physical processor configured to execute the identification module, the reading module, and the combining module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a command to duplicate a data unit to tape storage after a previous version of the data unit has already been duplicated to tape storage, (ii) identify metadata that distinguishes between segments of the data unit that have not changed since the previous version of the data unit already duplicated to tape storage and segments of the data unit that have changed since the previous version of the data unit, (iii) read the previous version of the data unit from tape storage and read the segments of the data unit that have changed from a data sharing storage rather than tape storage, and (iv) combine, using the metadata, the segments read from tape storage that have not changed since the previous version and the segments read from the data sharing storage that have changed to duplicate the data unit to tape storage.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
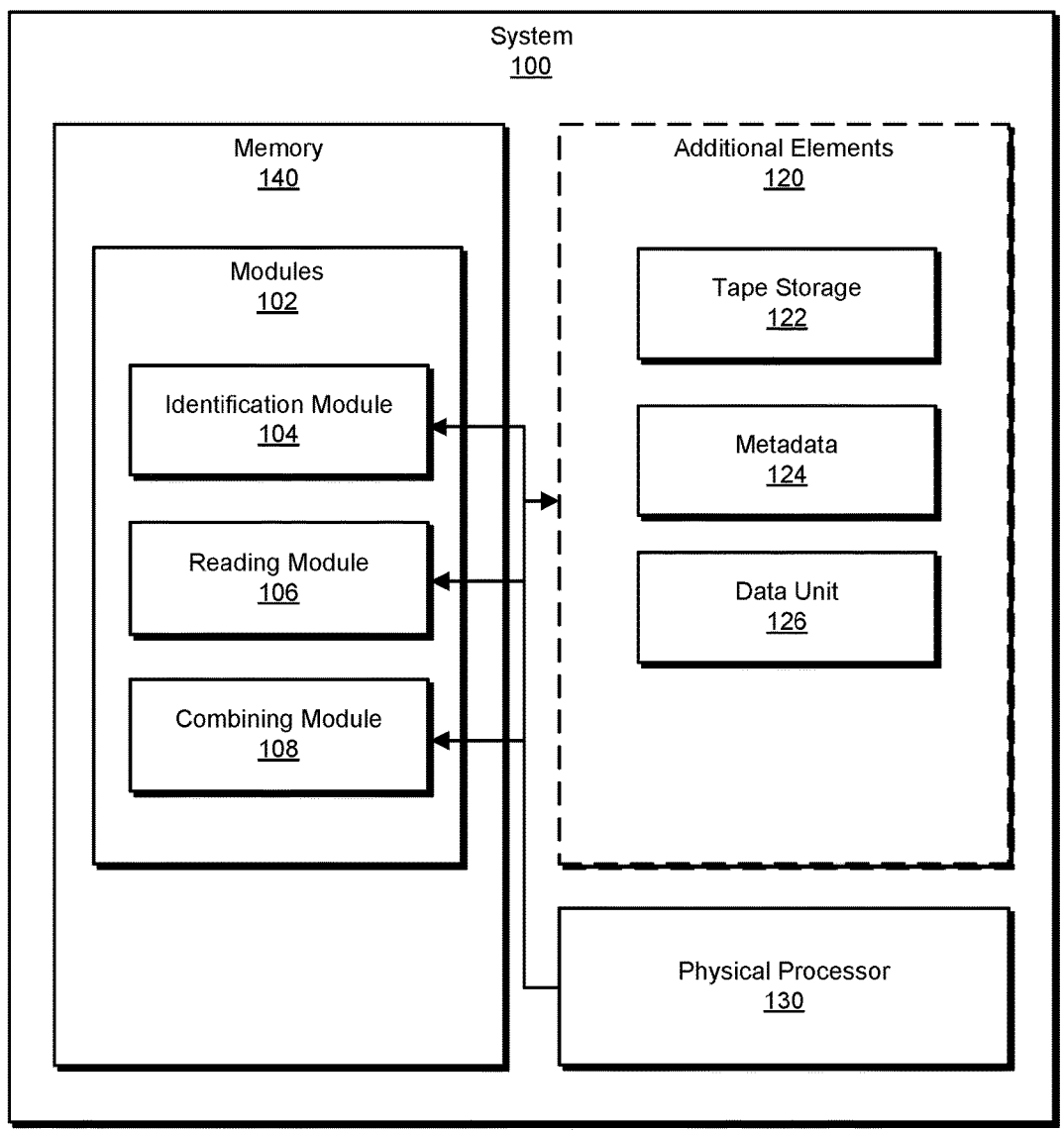
FIG. 1 is a block diagram of an example system for improving the efficiency of recording data to tape.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for improving the efficiency of recording data to tape. As will be explained in greater detail below, the disclosed systems and methods may improve the speed and efficiency of recording data to tape by, for example, leveraging a tape copy of a previous version of the data rather than reading the previous version from a slower or defragmented disk drive. The disclosed systems and methods may also improve the speed and efficiency of recording data to tape by intelligently referencing metadata or an extent map that indicates which data segments are changed and unchanged between the previous version of the data and the current or target version of the data.

Figure 2:
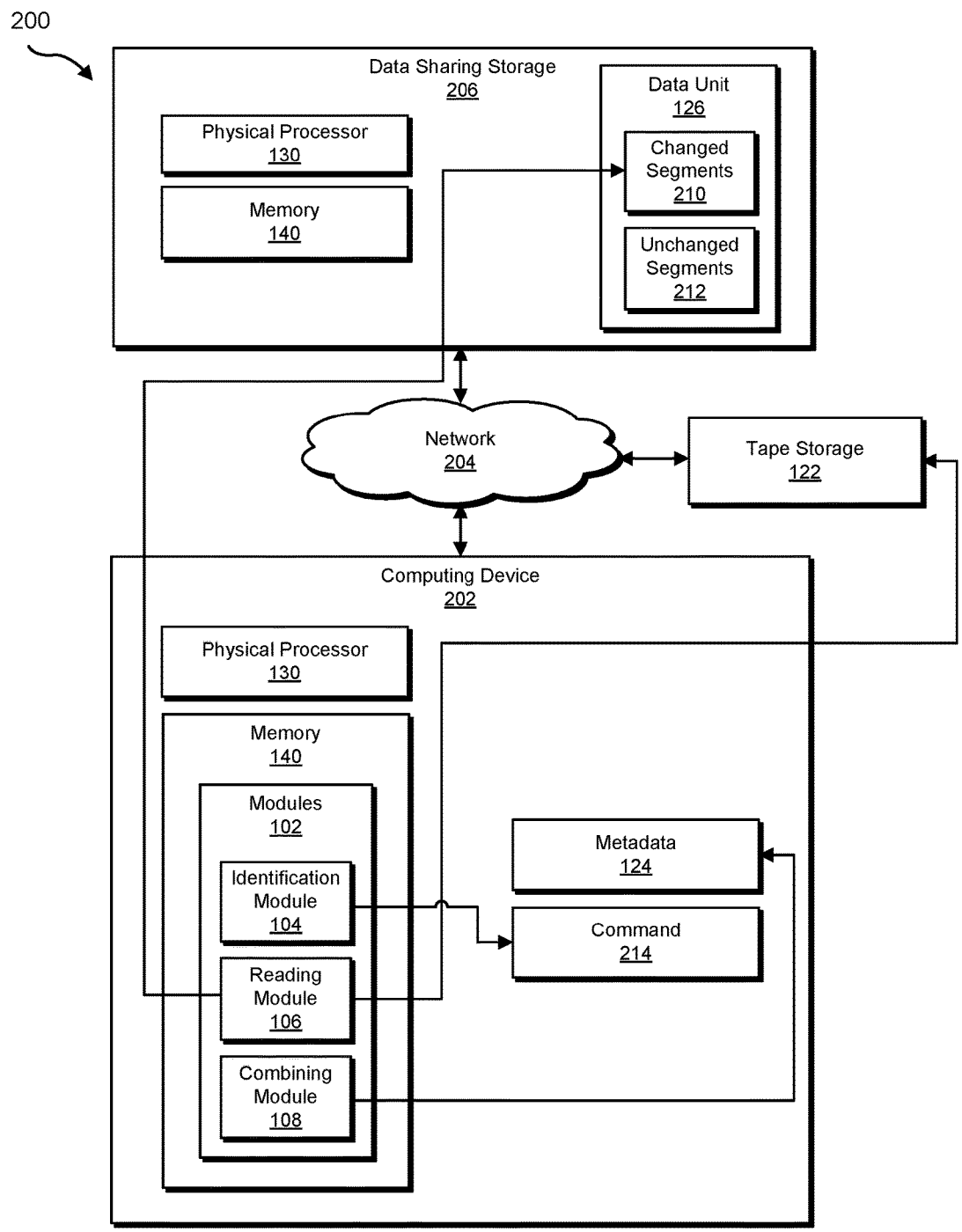
FIG. 2 is a block diagram of an additional example system for improving the efficiency of recording data to tape.

The following will provide, with reference to FIGS. 1-2, detailed descriptions of example systems for improving the efficiency of recording data to tape. Detailed descriptions of corresponding computer-implemented methods will also be provided in connection with FIGS. 3-5.

FIG. 1 is a block diagram of example system 100 for improving the efficiency of recording data to tape. As illustrated in this figure, example system 100 may include one or more modules 102 for performing one or more tasks. For example, and as will be explained in greater detail below, example system 100 may include an identification module 104 that identifies a command to duplicate a data unit to tape storage after a previous version of the data unit has already been duplicated to tape storage. Identification module 104 may also identify metadata that distinguishes between segments of the data unit that have not changed since the previous version of the data unit already duplicated to tape storage and segments of the data unit that have changed since the previous version of the data unit. Example system 100 may additionally include a reading module 106 that reads the previous version of the data unit from tape storage and reads the segments of the data unit that have changed from a data sharing storage rather than tape storage. The data sharing storage may link a same instance of a common data portion to at least two instances of corresponding data that share the common data portion. Example system 100 may also include a combining module 108 that combines, using the metadata, the segments read from tape storage that have not changed since the previous version and the segments read from the data sharing storage that have changed to duplicate the data unit to tape storage. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or data sharing storage 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As further illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improving the efficiency of recording data to tape. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements, such as additional elements 120. In one example, additional elements 120 may include a tape storage 122, metadata 124, and a data unit 126. Additional elements 120 will be discussed further in connection with FIG. 3 below. Notably, as used herein, the term "tape storage" generally refers to any magnetic tape data storage that stores digital information on magnetic tape using digital recording. Tape storage, as used herein, generally is contrasted with shared data storage, which generally refers to non-tape or disk storage that may suffer from defragmentation over time. Additionally, as used herein, the term "shared data storage" generally refers to storage that reduces physical data size by linking a common portion of data to two separate instances of data that both reference and share the common portion of data rather than storing the common portion twice. Some examples of data sharing that reduce physical data size in this manner include data deduplication and data snapshot functionality. Additionally, metadata 124 and data unit 126 generally have the form of data stored within one or more memory or storage devices, as discussed further below.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a data sharing storage 206 via a network 204. In one example, computing device 202 may be programmed with one or more of modules 102. Additionally or alternatively, shared data sharing storage 206 may be programmed with one or more of modules 102, according to any suitable permutation.

In one embodiment, one or more of modules 102 from FIG. 1 may, when executed by at least one processor of computing device 202 and/or data sharing storage 206, enable computing device 202 and/or data sharing storage 206 to improve the efficiency of recording data to tape. For example, and as will be described in greater detail below, identification module 104 may identify a command 214 to duplicate data unit 126 to tape storage 122 after a previous version of data unit 126 has already been duplicated to tape storage 122. Identification module 104 may identify metadata that distinguishes between segments of data unit 126 that have not changed (i.e., unchanged segments 212) since the previous version of data unit 126 already duplicated to tape storage 122 and segments of data unit 126 that have changed (i.e., changed segments 210) since the previous version of data unit 126. Reading module 106 may read the previous version of data unit 126 from tape storage 122 and read the segments of data unit 126 that have changed from data sharing storage 206 rather than tape storage 122. Data sharing storage 206 may link a same instance of a common data portion to at least two instances of corresponding data that share the common data portion. Combining module 108 may combine, using metadata 124, the segments read from tape storage 122 that have not changed since the previous version and the segments read from data sharing storage 206 that have changed to duplicate data unit 126 to tape storage 122.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device.

Data sharing storage 206 generally represents any type or form of computing device or storage device that stores data and reduces a physical size of the data by linking at least two instances of data that share a common portion to an instance of the common portion rather than storing the common portion twice. Data sharing storage 206 may optionally include physical processor 130, as shown in FIG. 2. Examples of data sharing storage 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 204 may facilitate communication or data transfer using wireless or wired connections. In one embodiment, network 204 may facilitate communication between computing device 202 and data sharing storage 206.

Figure 3:
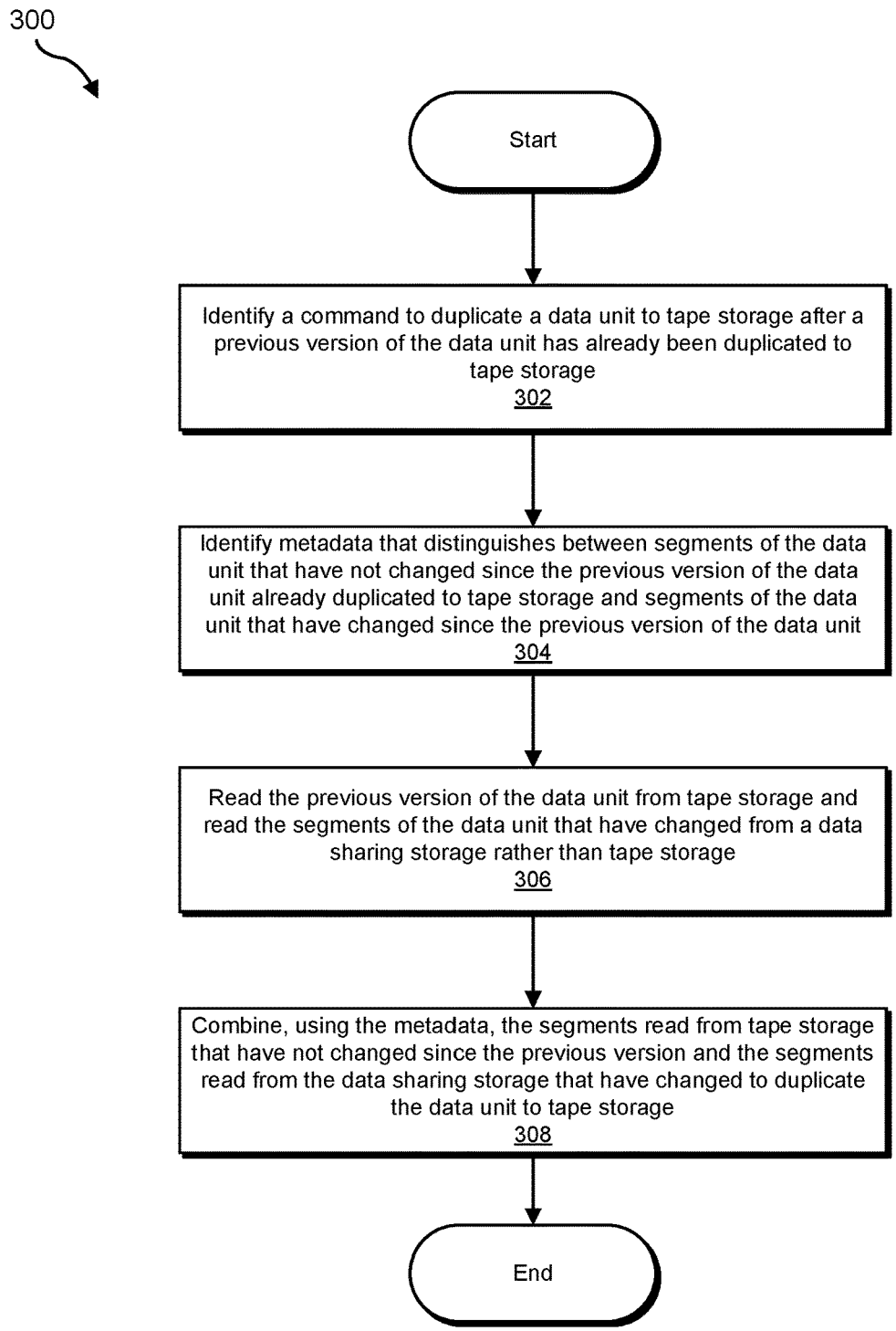
FIG. 3 is a flow diagram of an example method for improving the efficiency of recording data to tape.

FIG. 3 is a flow diagram of an example computer-implemented method 300 for improving the efficiency of recording data to tape. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302, one or more of the systems described herein may identify a command to duplicate a data unit to tape storage after a previous version of the data unit has already been duplicated to tape storage. For example, identification module 104 may, as part of computing device 202 in FIG. 2, identify a command to duplicate data unit 126 to tape storage 122 after the previous version of data unit 126 has already been duplicated to tape storage 122.

As used herein, the term "command" generally refers to any indication of a request or instruction, within a computing environment, to duplicate the data unit. Additionally, as used herein, the term "data unit" generally refers to any item or collection of data for storing on memory or backing up. In some embodiments, the data unit may refer to a specified set of folders or files. Additionally, in some embodiments, the data unit may refer to a disk image. In these embodiments, the disk image stores both the content and the structure for at least one of a disk volume and a storage device. Additionally, as used herein, the disk image generally includes a sector-by-sector copy of a source medium.

Identification module 104 may identify the command in a variety of ways. Identification module 104 may identify a manual command to duplicate the data unit. For example, a human user or administrator may issue the command to duplicate the data unit. Additionally, or alternatively, identification module 104 may identify an automated or autonomous command to duplicate the data unit. For example, a data storage or backup system may be configured to duplicate the data unit according to a predefined schedule, such as daily or weekly, as discussed further below.

At step 304, one or more of the systems described herein may identify metadata that distinguishes between segments of the data unit that have not changed since the previous version of the data unit already duplicated to tape storage and segments of the data unit that have changed since the previous version of the data unit. For example, identification module 104 may, as part of computing device 202 in FIG. 2, identify metadata 124 that distinguishes between segments of data unit 126 that have not changed since the previous version of data unit 126 already duplicated to tape storage 122 and segments of data unit 126 that have changed since the previous version of data unit 126.

As used herein, the term "metadata" generally refers to any data that describes an underlying data unit more specifically by indicating which segments of the data unit have changed or not, as discussed further below. In some examples, the metadata may include file size information and/or an extent map. In some examples, an extent map within data sharing storage 206 may include or constitute file metadata that records fingerprints and sizes of extents that compose a corresponding file. In one illustrative example, a file may have three extents. One extent may have a fingerprint of "eda98c85f32d113fc6b225e5892f34bb7e9b0460c45f4b8a 96b1b245df8478bf" and may have a size of 32 kilobytes. The fingerprint of the extent may be the hash value of the extent from a strong hash algorithm such as SHA256.

More generally, an "extent" may refer to a contiguous area of storage reserved for a file in a file system and may be represented as a range. A file can include or consist of zero or more extents and one file fragment may create or correspond to one extent. Using extents may create the benefit of storing each range compactly as two numbers instead of canonically storing every block number in the range.

Identification module 104 may identify the metadata in a variety of ways. For example, identification module 104 may identify the metadata by generating the metadata that distinguishes between segments of the data unit that have not changed since the previous version of the data unit already duplicated to tape storage and segments of the data unit that have changed since the previous version of the data unit. For example, identification module 104 may create the metadata by comparing the extent map of a later version of a file to the extent map of the previous version of the file to thereby discover which extents have changed.

In some examples, generating the metadata is performed in response to the command to duplicate the data unit to tape storage. For example, in response to the command, identification module 104 may retrieve extent maps for the previous version of the data unit and for the current or target version of the data unit and/or compare the extent maps to identify the changed extents. More specifically, identification module 104 may compare the fingerprints for the extents to identify which fingerprints have changed and, therefore, which extents have changed. As a more specific illustrative example, data sharing storage 206 may store the following extent map that includes fingerprint and/or extent size information for three separate extents for the previous version of the data unit:

<eda98c85f32d113fc6b225e5892f34bb7e9b0460c45f4b 8a96b1b245df8478b f, 32 KB>
<48598c85f32d113fc6b225e5892f34bb7e9b0460c45f4b 8a96b1b245df8478b f, 32 KB>
<bb236c85f32d113fc6b225e5892f34bb7e9b0460c45f4b 8a96b1b245df8478b f, 32 KB>

Additionally, data sharing storage 206 may store the following extent map that includes fingerprint and/or extent size information for the three separate extents for the current or target version of the data unit:

<eda98c85f32d113fc6b225e5892f34bb7e9b0460c45f4b 8a96b1b245df8478b f, 32 KB>
<45555855f32d113fc6b225e5892f34bb7e9b0460c45f4b 8a96b1b245df8478b f, 32 KB>
<bb236c85f32d113fc6b225e5892f34bb7e9b0460c45f4b 8a96b1b245df8478b f, 32 KB>

In this specific illustrative example, the second extent fingerprint has changed, which indicates that the second extent has changed. Accordingly, identification module 104 may perform the comparison to generate the metadata indicating that the second extent, but not the first and third extent, has changed. In other examples, identification module 104 may generate the metadata preemptively, without the generation being performed in response to command 214, such as generating the metadata according to a predetermined schedule or interval.

At step 306, one or more of the systems described herein may read the previous version of the data unit from tape storage and read the segments of the data unit that have changed from a data sharing storage rather than tape storage. The data sharing storage may link a same instance of a common data portion to at least two instances of corresponding data that share the common data portion, as further described above. For example, reading module 106 may, as part of computing device 202 in FIG. 2, read the previous version of data unit 126 from tape storage 122 and read the segments of data unit 126 that have changed from data sharing storage 206 rather than tape storage 122. Notably, as used herein, the phrase "read the previous version of the data unit from tape storage" generally refers to reading all, substantially all, or some of the previous version of the data unit in any manner that is suitable for achieving the performance of method 300 for the corresponding efficiency improvements described herein (i.e., reading at least a length of the previous version of the data unit on tape storage that includes the original and unchanged segments to be included within the current version of the data unit in the process of being duplicated to tape storage at step 308).

Figure 4:
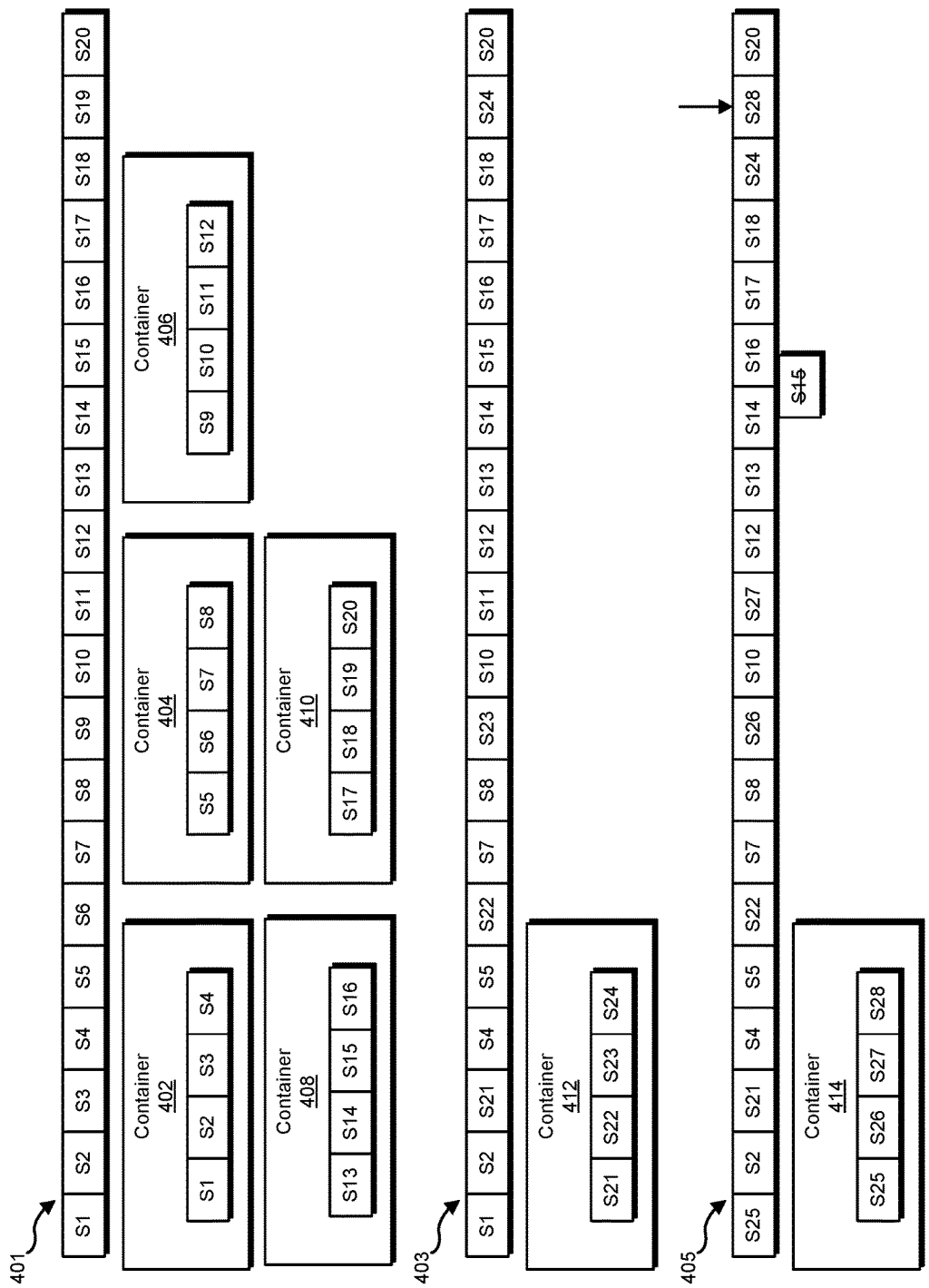
FIG. 4 is a block diagram of example data units referenced by systems and methods for improving the efficiency of recording data to tape.

Reading module 106 may read the data segments in a variety of ways. FIG. 4 shows an original version 401 of data unit 126 as well as a subsequent version 403 and an additional subsequent version 405, which may correspond to a current or target version. Notably, throughout this figure, segments within data unit 126 are stored within respective containers, including containers 402-414. Although not shown in this figure, original version 401 may also be stored within tape storage 122.

By way of background, this figure further shows that original version 401 includes 20 separate segments. The figure also shows that container 402 stores the first four segments, S1-S4. Similarly, container 404 stores segments S5-S8, container 406 stores segments S9-S12, container 408 stores segments S13-S16, and container 410 stores segments S17-S20. Additionally, this figure further shows that, in subsequent version 403, segment S3 has been replaced with a new segment, S21. Similarly, segment S6 has been replaced with a segment S22, segment S9 has been replaced with a segment S23, and segment S19 has been replaced with a segment S24.

Furthermore, this figure also illustrates how, in current or target version 405, segment S1 has been replaced with a segment S25, segment S23 has been replaced with a segment S26, segment S11 has been replaced with a segment S27, segment S15 has been deleted, and a segment S28 has been inserted between segments S24 and S20. Notably, although the new segments within container 412 and container 414 are stored sequentially within those containers, the new segments are scattered across the corresponding data unit 126.

In other words, from FIG. 4, one can see that segments S25, S26, S27, and S28, for example, are stored sequentially in container 414, but they are not sequential within the corresponding data unit 126 (e.g., a disk image). Accordingly, when data unit 126 is duplicated to tape storage 122 from data sharing storage 206 (i.e., without using the tape-based efficiency improvements described at steps 306 and 308), the segments within container 414 would not be read sequentially but, instead, would be read in a stop-and-go fashion as the data sharing storage traverses data unit 126 and encounters these data segments scattered across the corresponding disk image. In this example, data sharing storage 206 would read the segments within container 414 using four separate read commands that keep returning to container 414 after referencing other containers.

In contrast, the improved systems and methods described herein may not reference the containers in the order in which they appear referenced within the data unit (i.e., reading the container for segment S1, then reading the container for segment S2, then reading the container for segment S3, and so on). Rather, the improved systems and methods described herein may reference container 414 in a single read operation that efficiently obtains each of the four new segments. Later, when combining module 108 combines segments to generate the current or target version of data unit 126, combining module 108 may reference the new segments within a memory or buffer that has stored them after they were read efficiently in one read operation from container 414.

Notably, in one embodiment, the previous version of the data unit is separately available on both tape storage and the data sharing storage. Additionally, in this embodiment, reading the previous version of the data unit from tape storage is faster than reading the data unit from the data sharing storage. In general, reading the previous version of the data unit from tape storage may be faster than reading the data unit from the data sharing storage because of defragmentation on the data sharing storage. Furthermore, in this embodiment, reading module 106 may read the previous version of the data unit from tape storage to achieve an efficiency improvement over reading the data from the data sharing storage.

In one embodiment, the data sharing storage stores multiple segments of the data unit in separate original storage containers. In the example of FIG. 4, data sharing storage 206 stores the segments that make up data unit 126 within five separate containers, containers 402-410. In further embodiments, the data sharing storage stores multiple segments of each portion sequentially within a respective original storage container and stores each changed segment of the data unit sequentially within at least one additional container, separate from the original storage containers. Returning to the example of FIG. 4, data sharing storage 206 stores the segments within original containers 402-410 sequentially (e.g., S1, S2, S3, and so on). Similarly, data sharing storage 206 stores the segments within container 414 sequentially as well (i.e., S25, S26, S27, and so on). In these examples, storing segments sequentially enables the segments to be read faster than if the segments were stored non-sequentially, as further described above. Additionally, in some examples, the segments read from tape storage that have not changed since the previous version include a majority of the segments combined to duplicate the data unit. In the more specific example of FIG. 4, the current version 405 of data unit 126 includes seven changed segments (i.e., in the order shown in FIG. 4, S25, S21, S22, S26, S27, S24, and S28) while also including thirteen original segments (i.e., the remainder of version 405 of data unit 126 shown within FIG. 4), such that the thirteen original segments form the majority. Because the original segments form the majority, and because the original segments may be read more quickly from a tape backup of original version 401 of data unit 126, the disclosed systems and methods may improve upon the related art by reading these original segments from tape storage 122.

In one embodiment, the data sharing storage may include an integrated purpose-built backup appliance ("PBBA"). "Integrated," as used herein, generally refers to system 100 having master or media servers built into itself to orchestrate the backup and movement of data to other systems or removable media such as tape. Similarly, "integrated," as used herein, generally contrasts with target appliances, which are dependent on third-party backup software and designed to integrate in heterogeneous environments. Integrated purpose-built backup appliances may include VERITAS NETBACKUP 5200 and 5300 series appliances. Additionally, data sharing storage 206 may also correspond to the VERITAS VELOCITY series product line.

At step 308, one or more of the systems described herein may combine, using the metadata, the segments read from tape storage that have not changed since the previous version and the segments read from the data sharing storage that have changed to duplicate the data unit to tape storage. For example, combining module 108 may, as part of computing device 202 in FIG. 2, combine, using metadata 124, the segments read from tape storage 122 that have not changed since the previous version and the segments read from data sharing storage 206 that have changed to duplicate data unit 126 to tape storage 122. Notably, as used herein, the phrase "duplicate data unit 126 to tape storage 122" generally refers to outputting the current or target version of the data unit 126 to a new tape medium or cassette other than the tape medium or cassette used to record the previous version of data unit 126 (with the exception that, optionally in the case of rewritable tape storage, the same tape medium or cassette may be used).

Figure 5:
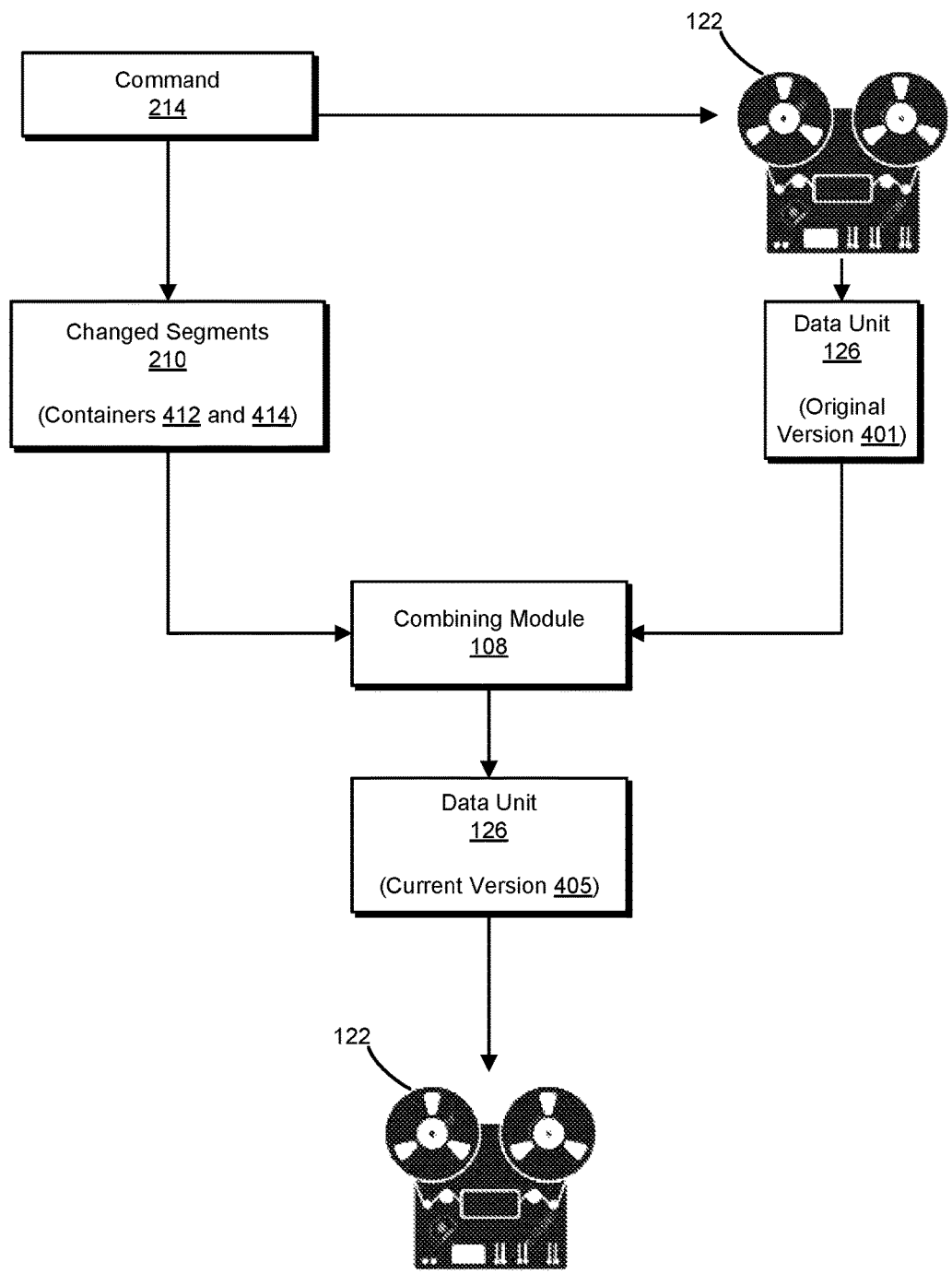
FIG. 5 is a block diagram of an example workflow further illustrating examples of systems and methods for improving the efficiency of recording data to tape.

Combining module 108 may combine the segments in a variety of ways. FIG. 5 shows an example workflow diagram that further illustrates an example of how to combine the segments according to step 308 of method 300. As shown in this figure, in response to command 214, reading module 106 may read original version 401 of data unit 126 from tape storage 122. Similarly, in response to command 214, reading module 106 may also read changed segments 210, which may correspond to the segments within containers 412 and 414 shown within FIG. 4, from data sharing storage 206. Notably, reading module 106 may read the changed segments sequentially within these respective containers rather than reading them in a fragmented fashion while traversing the entire data unit, as described above. After reading module 106 performs step 306, combining module 108 may intelligently or selectively combine segments from these two sources, by referencing the metadata, to duplicate a current or target version of data unit 126, which may correspond to current version 405 shown within FIG. 4, to tape storage 122.

In the example of FIG. 4, combining module 108 may first write segment S25, which has been read from container 414 and stored within a corresponding buffer, to the target medium on tape storage. Combining module 108 may then write segment S2, which is been read from original version 401 on tape storage, to the target medium on tape storage. Similarly, combining module 108 may then write segment S21, which has been read from container 412 and stored within the corresponding buffer, to the target medium on tape storage. Subsequently, combining module 108 may then write segments S4 and S5, which have been read from original version 401 on tape storage, to the target medium on tape storage. And so on. During this process, combining module 108 may reference the metadata to determine whether each segment is modified or not and, accordingly, whether to retrieve and write the segment using original version 401 on tape or, instead, containers 412 and 414, which have been copied to the corresponding buffer.

In some examples, combining module 108 may combine, using the metadata, the segments read from tape storage that have not changed since the previous version and the segments read from the data sharing storage that have changed on a scheduled frequency of at least once weekly. For example, the schedule may correspond to hourly, daily, and/or weekly, or any other suitable schedule at a fixed or irregular interval that performs the combining at least once weekly. Combining the segments at least once weekly helps to ensure that a majority of the data segments have not changed, as outlined above, thereby further helping to ensure that reading the prior version of the data unit from tape storage achieves the efficiency improvements described herein.

The above discussion provides an overview of method 300 in FIG. 3. For completeness, the following discussion provides a further overview of concrete details of specific embodiments of the disclosed systems and methods.

It is a common practice for an enterprise customer to store a backup copy of critical business data on tape. In this common scenario, data is read from a data sharing storage such as VELOCITY storage or VERITAS appliance 5330 and written to tape for longer term retention and compliance requirements. Due to the nature of data sharing technology such as snapshot and deduplication, images get fragmented over time, and data duplication to tape is relatively slow. The disclosed systems and methods present a technique to achieve fast tape out performance by leveraging the last tape image as a base and applying the changed data blocks from data sharing storage on the fly to write a new full backup image on tape. The disclosed systems and methods thereby avoid random read operations from VELOCITY storage on the unchanged data segments (notably, the data will be fragmented as time goes by). The disclosed systems and methods also benefit from sequential reading of the unchanged data segments from tape and changed data segments from VELOCITY storage containers.

In one example, when file A is duplicated to a tape, all data needs to be read from different containers to write to a tape in the right order based on the file content. Reads create a lot of random disk accesses and therefore incur a slow tape out performance. With the disclosed systems and methods, during tape out, the last image of the same data source which exists on a source tape is read as an image base from one tape drive, and the new updates since the tape out image are read to merge with the base to form the up to date image and write to a tape on a second tape drive. Before the tape out operation, the changed data blocks between the tape image and the image on the data sharing storage to be duplicated to tape is determined.

For simplicity, this discussion may reference VELOCITY storage as an example of the data sharing storage. Determining which segments are changed can be easily done based on the extent maps of the image on VELOCITY storage corresponding to the tape image and the new image version to be taped out. During the tape out operation, data not changed since the last tape out operation is read from tape, and data changed since the last tape out operation is read from VELOCITY storage containers. Since tape out is performed daily or weekly, the data read from the source tape is composed of a majority of the data to be duplicated to the target tape. The changed data segments on VELOCITY storage since the last tape out are stored sequentially on disk within containers and, accordingly, can be read fast. These data extents are sequential on disk but may be scattered within the image to be taped out, and thus a memory buffer may be used to hold them before they are inserted into the data read from the source tape to form the new target tape image.

Notably, some related art systems cannot fully utilize tape throughput because the reading operations that read from the disk base backup device are random. In contrast, the disclosed systems and methods may perform sequential read operations from both disk and tape to thereby achieve high tape-out throughput and reduce load to disk.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving the efficiency of recording data to tape, at least a portion of the method being performed by a computing device comprising at least one processor, the method comprising:
   identifying a command to duplicate a data unit to tape storage after a previous version of the data unit has already been duplicated to tape storage;
   identifying metadata that distinguishes between blocks of the data unit that have not changed since the previous version of the data unit already duplicated to tape storage and blocks of the data unit that have changed since the previous version of the data unit at least in part by comparing extent maps for the previous version of the data unit and extent maps for a current version of the data unit to identify changed extents;
   reading the previous version of the data unit from tape storage and reading the blocks of the data unit that have changed from a data sharing storage rather than tape storage, the data sharing storage linking a same instance of a common data portion to at least two instances of corresponding data that share the common data portion; and
   combining, using the metadata, the blocks read from tape storage that have not changed since the previous version and the blocks read from the data sharing storage that have changed to duplicate the data unit to tape storage, wherein the blocks read from the data sharing storage that have changed since the previous version are stored sequentially on data extents of the data sharing storage but are located non-sequentially across the data unit.

2. The computer-implemented method of claim 1, wherein the data unit comprises a disk image.

3. The computer-implemented method of claim 2, wherein the disk image stores both the content and the structure for at least one of a disk volume and a storage device.

4. The computer-implemented method of claim 2, wherein the disk image comprises a sector-by-sector copy of a source medium.

5. The computer-implemented method of claim 1, wherein:
   the previous version of the data unit is separately available on both tape storage and the data sharing storage;
   reading the previous version of the data unit from tape storage is faster than reading the data unit from the data sharing storage; and reading the previous version of the data unit from tape storage is performed to achieve an efficiency improvement over reading the data from the data sharing storage.

6. The computer-implemented method of claim 5, wherein reading the previous version of the data unit from tape storage is faster than reading the data unit from the data sharing storage at least in part due to the data unit being fragmented on the data sharing storage.

7. The computer-implemented method of claim 1, wherein identifying the metadata comprises generating the metadata that distinguishes between blocks of the data unit that have not changed since the previous version of the data unit already duplicated to tape storage and blocks of the data unit that have changed since the previous version of the data unit.

8. The computer-implemented method of claim 7, wherein generating the metadata is performed in response to the command to duplicate the data unit to tape storage.

9. The computer-implemented method of claim 1, wherein the data sharing storage stores multiple blocks of the data unit in separate original storage containers.

10. The computer-implemented method of claim 9, wherein the data sharing storage stores:
    multiple blocks of each portion sequentially within a respective original storage container; and
    each changed block of the data unit sequentially within at least one additional container, separate from the original storage containers.

11. The computer-implemented method of claim 10, wherein storing blocks sequentially enables the blocks to be read faster than if the blocks were stored non-sequentially.

12. The computer-implemented method of claim 1, wherein the combining, using the metadata, the blocks read from tape storage that have not changed since the previous version and the blocks read from the data sharing storage that have changed is performed on a scheduled frequency of at least once weekly.

13. The computer-implemented method of claim 1, wherein the blocks read from tape storage that have not changed since the previous version comprise a majority of the blocks combined to duplicate the data unit.

14. The computer-implemented method of claim 1, wherein:
    the blocks read from the data sharing storage that have changed since the previous version are read sequentially from the data extents of the data sharing storage;
    reading the blocks that have changed sequentially eliminates a more inefficient process of performing random read operations that reference containers in an order in which they appear referenced within the data unit.

15. The computer-implemented method of claim 1, wherein, prior to combining the blocks using the metadata, the blocks read from the data sharing storage that have changed since the previous version are stored within a buffer to enable these blocks to be reordered during combining with the blocks read from tape storage that have not changed since the previous version to duplicate the data unit to tape storage.

16. The computer-implemented method of claim 1, wherein the data sharing storage comprises an integrated purpose-built backup appliance.

17. A system for improving the efficiency of recording data to tape, the system comprising:
    an identification module, stored in memory, that:
        identifies a command to duplicate a data unit to tape storage after a previous version of the data unit has already been duplicated to tape storage;
        identifies metadata that distinguishes between blocks of the data unit that have not changed since the previous version of the data unit already duplicated to tape storage and blocks of the data unit that have changed since the previous version of the data unit at least in part by comparing extent maps for the previous version of the data unit and extent maps for a current version of the data unit to identify changed extents;
    a reading module, stored in memory, that reads the previous version of the data unit from tape storage and that reads the blocks of the data unit that have changed from a data sharing storage rather than tape storage, the data sharing storage linking a same instance of a common data portion to at least two instances of corresponding data that share the common data portion;
    a combining module, stored in memory, that combines, using the metadata, the blocks read from tape storage that have not changed since the previous version and the blocks read from the data sharing storage that have changed to duplicate the data unit to tape storage; and
    at least one physical processor configured to execute the identification module, the reading module, and the combining module, wherein the blocks read from the data sharing storage that have changed since the previous version are stored sequentially on data extents of the data sharing storage but are located non-sequentially across the data unit.

18. The system of claim 17, wherein the data unit comprises a disk image.

19. The system of claim 18, wherein the disk image stores both the content and the structure for at least one of a disk volume and a storage device.

20. A non-transitory computer-readable medium comprising one or more computer-readable instructions that, when executed by at least one processor of a computing device, cause the computing device to:
    identify a command to duplicate a data unit to tape storage after a previous version of the data unit has already been duplicated to tape storage;
    identify metadata that distinguishes between blocks of the data unit that have not changed since the previous version of the data unit already duplicated to tape storage and blocks of the data unit that have changed since the previous version of the data unit at least in part by comparing extent maps for the previous version of the data unit and extent maps for a current version of the data unit to identify changed extents;
    read the previous version of the data unit from tape storage and read the blocks of the data unit that have changed from a data sharing storage rather than tape storage, the data sharing storage linking a same instance of a common data portion to at least two instances of corresponding data that share the common data portion; and
    combine, using the metadata, the blocks read from tape storage that have not changed since the previous version and the blocks read from the data sharing storage that have changed to duplicate the data unit to tape storage, wherein the blocks read from the data sharing storage that have changed since the previous version are stored sequentially on data extents of the data sharing storage but are located non-sequentially across the data unit.

* * * * *